US00RE44416E

(19) United States
(12) Reissued Patent
Kang

(10) Patent Number: US RE44,416 E
(45) Date of Reissued Patent: Aug. 6, 2013

(54) METHOD AND SYSTEM FOR CONTROLLING ACCESS TO A MOBILE COMMUNICATION TERMINAL

(75) Inventor: Taek Chan Kang, Seoul (KR)

(73) Assignee: LG Electronics Inc., Seoul (KR)

(21) Appl. No.: 13/452,765

(22) Filed: Apr. 20, 2012

Related U.S. Patent Documents

Reissue of:
(64) Patent No.: 7,702,314
Issued: Apr. 20, 2010
Appl. No.: 10/884,273
Filed: Jul. 2, 2004

(30) Foreign Application Priority Data

Jul. 5, 2003 (KR) ..... 10-2003-45515

(51) Int. Cl.
*H04W 12/06* (2009.01)
*H04W 12/08* (2009.01)
*H04B 1/40* (2006.01)

(52) U.S. Cl.
USPC ..... 455/411; 455/419; 455/558

(58) Field of Classification Search
USPC ..... 455/411, 410, 456.3, 550.1; 340/5.6, 340/569, 5.31, 5.53, 5.52; 382/117, 124; 726/3, 726/2, 26, 18
See application file for complete search history.

(56) References Cited

U.S. PATENT DOCUMENTS 4,945,556 A * 7/1990 Namekawa ..... 455/565
5,517,554 A * 5/1996 Mitchell et al. ..... 455/411
5,579,088 A * 11/1996 Ko ..... 399/12
5,887,250 A * 3/1999 Shah ..... 455/411
6,140,922 A * 10/2000 Kakou ..... 340/568.1
6,377,699 B1 * 4/2002 Musgrave et al. ..... 382/117
6,483,930 B1 * 11/2002 Musgrave et al. ..... 382/117
6,788,928 B2 * 9/2004 Kohinata et al. ..... 455/411
6,801,765 B1 * 10/2004 Roo et al. ..... 455/411
6,972,856 B1 * 12/2005 Takahashi ..... 358/1.14
6,993,156 B1 * 1/2006 Szeliski et al. ..... 382/103
2001/0016486 A1 * 8/2001 Ko ..... 455/411
2002/0090929 A1 * 7/2002 Cho ..... 455/410
2003/0163703 A1 8/2003 Robins et al.
2003/0172283 A1 * 9/2003 O'Hara ..... 713/186
2006/0058064 A1 * 3/2006 Satou ..... 455/558

FOREIGN PATENT DOCUMENTS

EP 0 863 674 A2 9/1998
JP 1999-146057 5/1999
JP 2000-137809 5/2000
JP 2000-278658 10/2000
JP 2000-307715 11/2000
JP 2000-307717 11/2000

(Continued)

OTHER PUBLICATIONS

Tsuhan Chen, et al., "A New Frame Interpolation Scheme for Talking Head Sequences", Sep. 1995 IEEE, pp. 591-594.

(Continued)

*Primary Examiner* — Kiet Doan
(74) *Attorney, Agent, or Firm* — Lee, Hong, Degerman, Kang & Waimey

(57) ABSTRACT

A system for limiting access to a mobile communication terminal comprises user interface for providing an option to select an authentication method to lock the mobile communication terminal; and memory for storing a plurality of lock codes, including image lock codes, inputted into the mobile communication terminal for locking the mobile communication terminal.

25 Claims, 5 Drawing Sheets

FOREIGN PATENT DOCUMENTS

| | | | |
|---|---|---|---|
| JP | 2001-142606 | | 5/2001 |
| JP | 2001-195146 | | 7/2001 |
| JP | 2002-077684 | | 3/2002 |
| JP | 2002-297257 | | 10/2002 |
| JP | 2003-284141 | | 10/2003 |
| KR | 10-2001-0090132 | A | 10/2001 |
| KR | 10-2002-0060494 | A | 7/2002 |
| KR | 10-2003-0042278 | A | 5/2003 |
| KR | 1020030042278 | | 5/2003 |

OTHER PUBLICATIONS

Thomas Wiegand, "Joint Video Team (JVT) of ISO/IEC MPEG and ITU-T VCEG", Dec. 2001, Pattaya, Thailand, pp. 2-75.

* cited by examiner

METHOD AND SYSTEM FOR CONTROLLING ACCESS TO A MOBILE COMMUNICATION TERMINAL

Matter enclosed in heavy brackets [ ] appears in the original patent but forms no part of this reissue specification; matter printed in italics indicates the additions made by reissue.

BACKGROUND

CROSS-REFERENCE TO RELATED APPLICATIONS

[Pursuant] *This Application is a reissue application of U.S. Pat. No. 7,702,314 B2, which issued on Apr. 20, 2010, the content of which is hereby incorporated by reference in its entirety, and pursuant* to 35 U.S.C. § 119(a), [this application] *U.S. Pat. No. 7,702,314 B2* claims the benefit of earlier filing date and right of priority to Korean Patent Application No. 2003/45515, filed on Jul. 5, 2003 (*now Korean Patent No. 10-0548372, registered on Jan. 24, 2006*), the content of which is *all* hereby incorporated by reference herein in [its entirety] *their entireties*.

1. Field of the Invention

The present invention relates to a method for limiting access to a mobile communication terminal having a camera and, more particularly, to a method for locking a mobile communication terminal by using one or more images as lock codes.

2. Description of the Related Art

Some mobile communication terminals have multimedia mobile communication equipments for providing various data transmission services in addition to voice communication service. Newer mobile communication terminals include a digital camera that is able to immediately photograph a desired object, store photographed images of the object, and output the respective images to an LCD or transmit the images to a remote device through a communication network.

Mobile communication terminals may have a locking function to protect information stored in the mobile terminal. Usually, the locking function of a mobile communication terminal is implemented by using a password (e.g., lock code) made up of numbers or several digits or characters. Sometime the password comprises four digits that are displayed at a rear portion of a phone, or some digits of the phone's registration number.

This easily accessible passwords and codes are dangerous as they can be exploited by an unauthorized user. Therefore, a locking system and method is desirable that can overcome the above shortcomings.

SUMMARY OF THE INVENTION

A method, for limiting access to a mobile communication terminal is provided. The method comprises photographing a first object to produce a first image; storing the first image; locking the mobile communication terminal; photographing a second object to produce a second image; comparing the first image with the second image; and unlocking the mobile terminal, if the second image matches the first image.

In one embodiment, the comparing comprises determining a difference of RGB color values between the first and second image; and determining that the second image matches the first image, when the difference of RGB color values is within a first tolerance threshold.

The method may further comprise determining a difference of RGB color values between the first and second images; determining a difference between sizes of objects photographed in the first and second images; and determining that the second image matches the first image, when the difference of RGB color values is within a first tolerance threshold and when the difference between sizes of the objects photographed is within a second tolerance threshold. In one embodiment, the photographing is performed by a digital camera embedded in the mobile communication terminal.

In accordance with another embodiment, a method for limiting access to a mobile communication terminal is provided. The method comprises providing an option to select an authentication method to lock the mobile communication terminal; and storing a plurality of lock codes inputted into the mobile communication terminal for locking the mobile communication terminal.

The plurality of lock codes comprise at least one of an alphanumeric lock code and an image lock code, wherein the image lock code comprises an image of a first object. When the image lock code is inputted, the mobile communication terminal stores RGB color values for the image and size information for the first object.

When the selected authentication method is a multi-image authentication method, the plurality of lock codes comprise at least two image lock codes. When the mobile communication terminal stores input order for the plurality of lock codes. When the selected authentication method is a multi-alphanumeric authentication method, the plurality of lock codes comprise at least two alphanumeric lock codes, for example.

In yet another embodiment, a system for limiting access to a mobile communication terminal comprises a camera for photographing first and second objects to produce a first image and a second image, wherein the first image is photographed before the mobile communication is locked, and the second image is photographed after the mobile communication terminal is locked; a memory for storing the first and second images; a locking mechanism for electronically locking the mobile communication terminal, in response to user input; a comparing mechanism for comparing the first image with the second image; and a mechanism for electronically unlocking the mobile terminal, if the second image matches the first image.

The comparing mechanism comprises means for determining a difference of RGB color values between the first and second image; and means for determining whether the second image matches the first image, when the difference of RGB color values is within a first tolerance threshold.

Means for determining a difference of RGB color values between the first and second images; means for determining a difference between sizes of objects photographed in the first and second images; and means for determining that the second image matches the first image, when the difference of RGB color values is within a first tolerance threshold and when the difference between sizes of the objects photographed is within a second tolerance threshold, may be also included in one embodiment of the system. The photographing is performed by a digital camera embedded in the mobile communication terminal, for example.

In accordance with one embodiment, a system for limiting access to a mobile communication terminal is provided. The method comprises user interface for providing an option to select an authentication method to lock the mobile communication terminal; and memory for storing a plurality of lock codes inputted into the mobile communication terminal for locking the mobile communication terminal.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

In the present invention, an image photographed through a digital camera of a mobile communication terminal is used as a lock code for locking and unlocking the mobile communication terminal. In addition, in the present invention, locking or unlocking of a mobile terminal is performed through several authentication stages.

Figure 1:
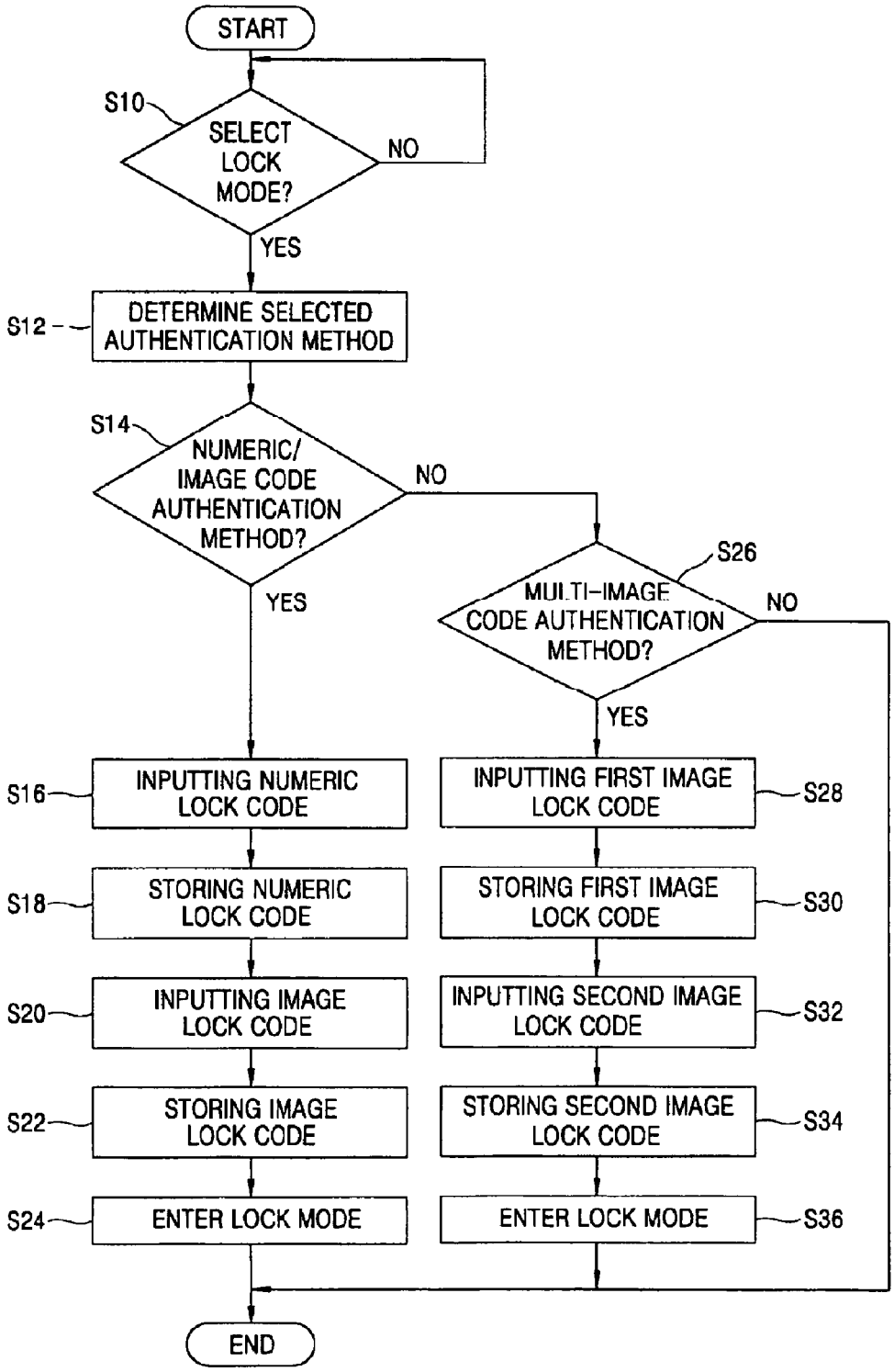
FIG. 1 is a flow chart of a method for locking and unlocking a mobile communication terminal by using an image, in accordance with a preferred embodiment of the present invention.

First, a method for locking a mobile communication terminal in accordance with a preferred embodiment of the present invention will be described. FIG. 1 is a flow chart of a method for locking a mobile communication terminal based on, an image photographed in accordance with a preferred embodiment of the present invention.

A lock mode can be selected by a user by way of interacting with a user interface or selecting form a menu (S10). The mobile communication terminal determines an authentication method selected by a user among a plurality of authentication methods (S12), based on the user selection from the menu.

The plurality of authentication methods comprise a numeric/image code authentication method for authentication with a numeric lock code or an image lock code. A multi-image code authentication method for authentication with multiple image lock codes and a multi-numeric code authentication method for authentication with multiple numeric lock codes may be also provided.

If the numeric/image code authentication method is selected (S14), the mobile communication terminal receives a password made up of numbers or characters from the user (S16) and stores the inputted password as a numeric lock code (S18).

Figure 2:
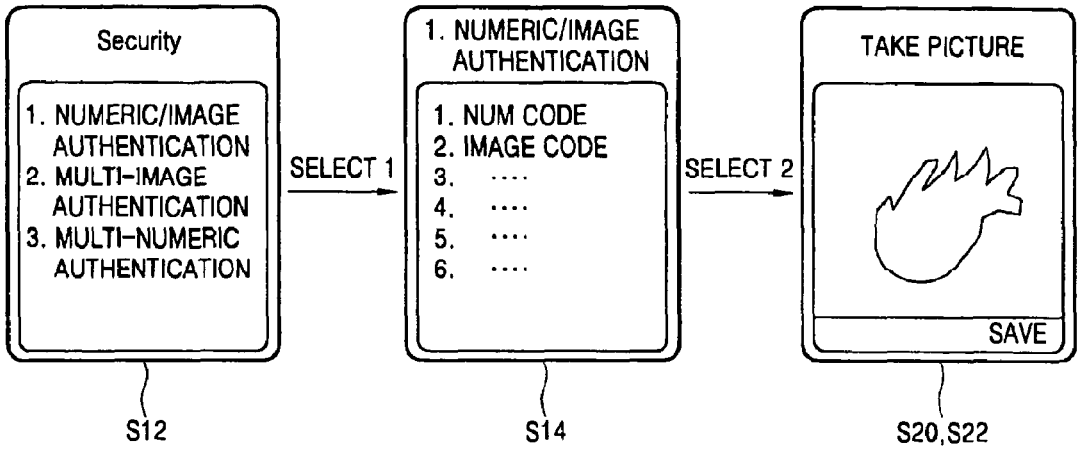
FIG. 2 illustrates display states provided to a user for locking the mobile communication terminal in accordance with one embodiment.

As shown in FIG. 2, the mobile communication terminal can photograph an object by a digital camera embedded in the mobile communication terminal, for example, to capture the image of the object and store it as an image lock code (S20 and S22). When the mobile communication terminal stores the image lock code, it also stores object size information of the image as well as characteristics of the photographed object image. The order of inputting the numeric lock code and the image lock code may vary depending on implementation.

Referring back to FIG. 1, when the numeric lock code and the image lock code are inputted, the mobile communication terminal enters a lock mode (S24). If the multi-image code authentication method is selected (S26), the mobile communication terminal photographs a first object through the digital camera, captures the photographed image of the object and stores it as a first image lock code (S28 and S30). Then, the mobile communication terminal photographs a second object (the first and second objects can be the same objects, for example), captures the photographed image, and stores it as a second image lock code (S32 and S34).

In one embodiment, when the mobile communication terminal stores the first and second image lock codes, it stores object size information on the images. The first and second image lock code input order as well as characteristics of the photographed images may be also stored. In the multi-image code authentication method, when two or more image lock codes are inputted, the mobile communication terminal enters a lock mode (S36).

Figure 3A:
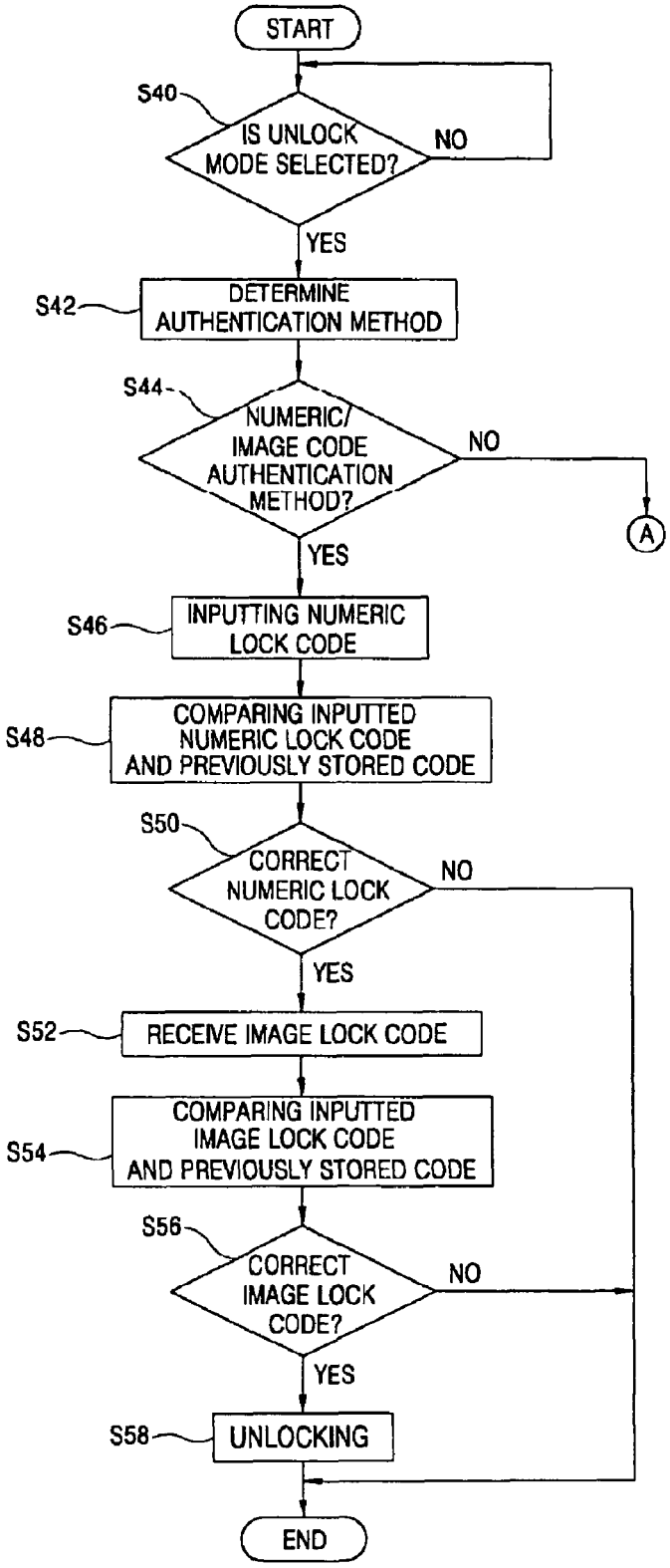
FIGS. 3A and 3B are flow charts of methods for unlocking the mobile communication terminal in accordance with a preferred embodiment of the present invention.
Figure 3B:
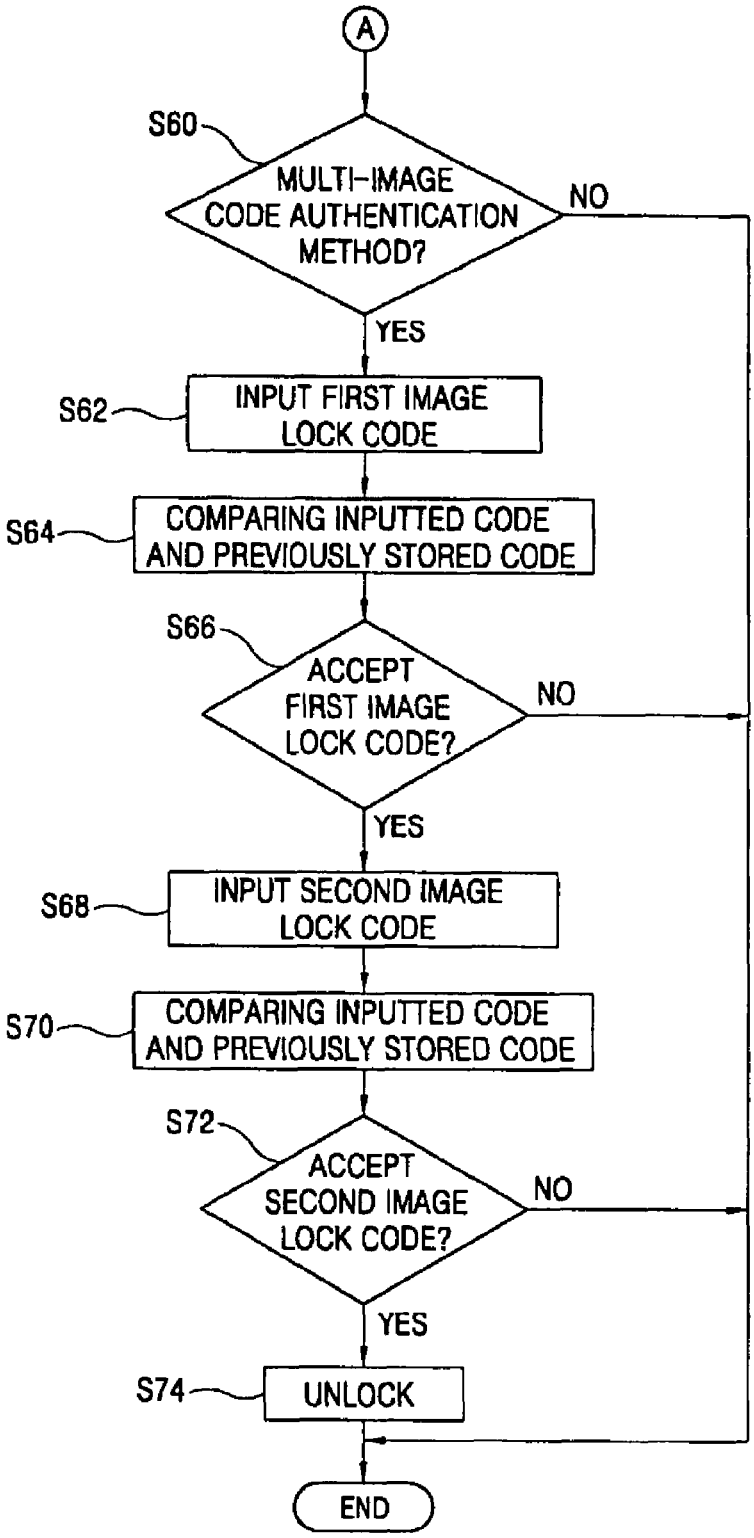

Referring to FIGS. 3A and 3B, if the mobile communication terminal is in the locked state, an unlock mode may be selected, according to a key input by a user (S40). The mobile communication terminal determines the authentication method selected for locking (S42).

Figure 4:
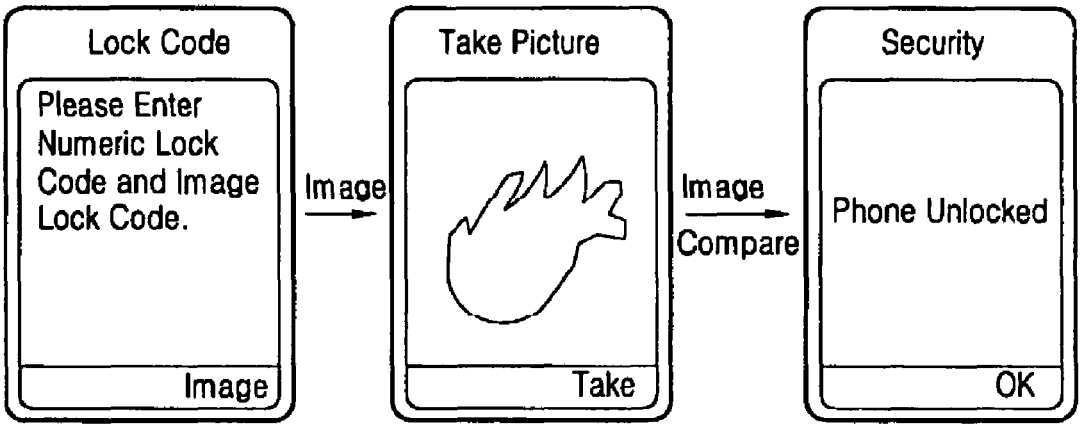
FIG. 4 illustrates display states provided to the user in unlocking the mobile communication terminal, in accordance with one embodiment.

If the selected authentication method is the numeric/image authentication method (S44), as shown in FIG. 4, the mobile communication terminal displays a message requesting inputting of a numeric lock code and an image lock code. When the numeric lock code is inputted by the user, the mobile communication terminal compares the inputted numeric lock code and a previously stored numeric lock code (S46 and S48). If the inputted numeric lock code matches the previously stored numeric lock code, the mobile communication terminal remains in the locked state (S50).

If the inputted numeric lock code matches the previously stored numeric lock code, the mobile communication terminal photographs and captures an object presented by the user in order to receive the image lock code (S52). The mobile communication terminal then compares the inputted image lock code and the previously stored image lock code (S54).

In comparing the images, RGB color values are compared on the basis of characteristics of the images. The sizes of objects on the images are also compared in one embodiment. For example, when hand of a user is photographed, the size of the hand on the photographed image can be different depending on the distance between the digital camera and the hand. Thus, although an image of the same hand is inputted, the size of the hand on the image can be different from the size of the hand on the previously stored image. In this case, authentication for the image of the inputted hand may fail in one embodiment.

In another embodiment, if the difference of RGB colors values between the inputted image and the previously stored image is within a first tolerance threshold, the two images are determined to be a match. When comparing the sizes of the object images, a similar tolerance threshold scheme can be implemented. That is if the difference between the size of the first and second images is within a second tolerance threshold, then the two images are determined to be a match.

If the inputted image lock code does not match the previously stored image lock code (S54), the mobile communication terminal stops the unlocking process and maintains the locked state (S56). If, however, the inputted image lock code and the previously stored image lock code are a match, the mobile communication terminal is unlocked (S58).

Referring to FIG. 3B, if the multi-image code authentication method is selected (S60), the mobile communication terminal displays a message requesting the input of a first image lock code. When the first object is presented by the user, the mobile communication terminal photographs and captures the first object (S62).

The mobile communication terminal then compares the first image lock code with the previously stored first image lock code (S64). If the first image lock code is acceptable (S66) (i.e., matches the stored image lock code), then the mobile communication terminal displays a message requesting inputting a second image lock code, and then photographs and captures a second object presented by the user (S68, S70).

To determine if the first image is acceptable, the mobile communication terminal compares the RGB color values and sizes on the basis of the image characteristics between the inputted first image lock code and the previously stored first image lock code. The mobile communication terminal also compares the RGB color values and object sizes on the basis of the image characteristics between the inputted second image lock code and the previously stored second image lock code in one embodiment.

If the difference of RGB color values between the inputted first and second image lock codes and the previously stored first and second image lock codes is within the first tolerance and difference of the object sizes is within a second tolerance threshold, the mobile communication terminal determines that the inputted first and second image lock codes are acceptable matches and the mobile communication terminal is unlocked (S74).

If, however, the difference in RGB color values between the inputted image lock codes and the previously stored, image lock codes is not within the first tolerance threshold, or if the difference of the object sizes on the images is not within the second tolerance threshold, the mobile communication terminal determines that the inputted first and second image lock codes are not acceptable matches and remains in the locked state.

The method for locking and unlocking a mobile communication terminal by using an image in accordance with the present invention has many advantages. A user can photograph a portion of human body or an object as desired and use the captured image as a lock code. Since authentication can be based on a combination of a numeric lock code and an image lock code, security of the locking function of a mobile communication terminal is improved. By performing an authentication based on multiple image lock codes, security of the locking function of the mobile communication terminal is even further improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for switching access state of a mobile device from a first state to a second state, the method comprising:

determining first color attributes corresponding to a first image captured by a user using a camera connected to the mobile device;

determining second color attributes corresponding to a lock code comprising a second image stored in a memory of the mobile device, wherein an alphanumeric character and the first image are input in sequence as part of a single lock code;

comparing the first and second color attributes to arrive at a first value; and switching from the first access state to the second access state, in response to determining that the first value is within a first range, indicating that the first and second images are relatively similar in color, without regard to how sharply focused the first and second images are, and wherein the lock code is not associated with the mobile device's unique identifier or other data that has been uniquely assigned to the mobile device by a party other than the user and wherein the lock code authentication is performed independent from any communication of the lock code to a base station or entity other than the mobile device.

2. The method of claim 1, wherein the first state is a lock state and the second state is an unlock state.

3. A method for switching access state of a mobile device from a first state to a second state, the method comprising:

determining first dimension attributes corresponding to a first image of an object captured by a user using a camera connected to the mobile device;

determining second dimension attributes corresponding to a lock code comprising a second image of an object stored in a memory of the mobile device, wherein an alphanumeric character and the first image are input in sequence as part of a single lock code;

comparing the first and second dimension attributes to arrive at a first value; and switching from the first access state to the second access state, in response to determining that the first value is within a first range, indicating that the first and second images are relatively similar in dimension, without regard to how sharply focused the first and second images are, and wherein the lock code is not associated with the mobile device's unique identifier or other data that has been uniquely assigned to the mobile device by a party other than the user and wherein the lock code authentication is performed independent from any communication of the lock code to a base station or entity other than the mobile device.

4. The method of claim 3, wherein the first state is a lock state and the second state is an unlock state.

5. A method for switching access state of a mobile device from a first state to a second state, the method comprising:

determining first dimension and color attributes corresponding to a first image of an object captured by a user using a camera connected to the mobile device;

determining second dimension and color attributes corresponding to a lock code comprising a second image of an object stored in a memory of the mobile device, wherein an alphanumeric character and the first image are input in sequence as part of a single lock code;

comparing the first and second dimension attributes to arrive at a first value;

comparing the first and second color attributes to arrive at a second value; and switching from the first access state to the second access state, in response to determining that the first value is within a first range and the second value is in a second range, indicating that the first and second images are relatively similar in dimension and color, without regard to how sharply focused the first and second images are, wherein the lock code is not associated with the mobile device's unique identifier or other data that has been uniquely assigned to the mobile device by a party other than the user and wherein the lock code authentication is performed independent from any communication of the lock code to a base station or entity other than the mobile device.

6. The method of claim 5, wherein the first state is a lock state and the second state is an unlock state.

7. A security system for switching access state of a mobile device from a first state to a second state, the system comprising:

a logic unit for determining first dimension attributes and first color attributes corresponding to a first image of an object captured by a user using a camera connected to the mobile device;

a logic unit for determining second dimension attributes and second color attributes corresponding to a lock code comprising a second image of an object stored in a memory of the mobile device, wherein an alphanumeric character and the first image are input in sequence as part of a single lock code;

a logic unit for comparing the first dimension attributes with the second dimension attributes, without regard to how sharply focused the first and second images are, to arrive at a first value; and a logic unit for comparing the first color attributes with the second color attributes, without regard to how sharply focused the first and second images are, to arrive at a second value, wherein the lock code is not associated with the mobile device's unique identifier or other data that has been uniquely assigned to the mobile device by a party other than the user and wherein the lock code authentication is performed independent from any communication of the lock code to a base station or entity other than the mobile device.

8. The system to claim 7, further comprising:

a logic unit for switching from the first access state to the second access state, in response to determining that the first value is within a first range and the second value is within a second range.

9. The system of claim 8, wherein the first value is in the first range when the first and second images are relatively similar in dimension.

10. The system of claim 7, wherein the second value is in the second range when the first and second images are relatively similar in color.

*11. A method for controlling a locked state of a mobile terminal, the method comprising:*

*registering a plurality of lock codes, that includes at least one numeric code and an image lock code;*

*selecting one lock mode from among a plurality of lock modes;*

*receiving the at least one numeric code when the selected lock mode is a combination numeric-image lock mode;*

*comparing the received numeric code with a registered numeric code;*

*maintaining the locked state of the mobile terminal when the received the at least one numeric code matches the registered numeric code;*

*capturing an image of an object via a camera connected to the mobile terminal;*

*comparing a lock code of the captured image with a registered image lock code; and*

*unlocking the locked state of the mobile terminal when the image matches the registered image lock code.*

*12. The method of claim 11, wherein registering the plurality of lock codes comprises:*

*selecting the one lock mode from among the plurality of lock modes;*

*inputting receiving the at least one numeric code and the registered image lock code in the selected lock mode; and*

*storing the received at least one numeric code and registered image lock code as a reference lock code.*

*13. The method of claim 11, wherein the plurality of lock modes includes a numeric or image lock mode, the combination numeric-image lock mode, a multi-image lock mode, and a multi-numeric lock code mode.*

*14. The method of claim 11, wherein the object includes a portion of a human body.*

*15. The method of claim 11, wherein the plurality of lock codes is used as an authentication method.*

*16. The method of claim 11, wherein the locked state of the mobile terminal is unlocked when a comparison result is within a first range indicating that first and second images are relatively similar.*

*17. The method of claim 11, further comprising:*

*capturing an image of a first object via camera connected to the mobile terminal when the selected lock mode is a multi-image lock code mode;*

*comparing a lock code of the captured first image with a registered first image lock code;*

*displaying a message requesting input of a second image lock code when the lock code of the first image lock code matches the registered first image lock code;*

*capturing an image of a second object via the camera;*

*comparing the captured second image lock code with a registered second image lock code; and*

*unlocking the locked state of the mobile terminal when a lock code of the second image matches the registered second image lock code.*

*18. The method of claim 17, further comprising comparing red-green-blue (RGB) color values and sizes on the basis of image characteristics between the image lock codes of the first and second images and the registered first and second image lock codes.*

*19. The method of claim 18, further comprising determining that the image lock codes of the first and second images match when:*

*a difference of RGB color values between the captured image lock codes of the first and second images,*

*the registered first and second image lock codes are within a first tolerance threshold, or*

*a difference between object sizes of the first and second images is within a second tolerance threshold.*

*20. A security system for controlling a locked state of a mobile terminal, the method comprising:*

*a logic unit configured to:*

*register a plurality of lock codes including at least numeric codes and image lock codes;*

*select one lock mode among a plurality of lock modes;*

*receive at least one numeric code when the selected one lock mode is a combination numeric-image lock mode;*

*compare the received numeric code with registered numeric codes;*

*maintain the locked state of the mobile terminal when the received numeric code matches the registered numeric codes;*

*capture an image of an object via a camera connected to the mobile terminal;*

*compare a lock code of the captured image with registered image lock codes; and*

*unlock the locked state of the mobile terminal when the lock code of the captured image matches the one of the registered image lock codes.*

*21. The system to claim 20, wherein the logic unit is further configured to:*

*receive at least one numeric code and registered image lock code in the selected one lock mode; and*

*store the received at least one numeric code and registered image lock code as a reference lock code.*

*22. The system to claim 20, wherein the plurality of lock modes includes the numeric or image lock mode, the combination numeric-image lock mode, a multi-image lock code mode, and a multi-numeric lock code node.*

*23. The system to claim 20, wherein the object includes a portion of a human body.*

*24. The system to claim 20, wherein the plurality of lock code is used as an authentication method.*

*25. The system to claim 20, wherein the logic unit configured is further configured to unlock the locked state of the mobile terminal when a comparison result is within a first range indicating that first and second images are relatively similar.*

* * * * *